Nov. 4, 1969     K. G. LUSHER     3,476,045
METHOD OF OFFSET PRINTING MULTICOLOR
IMAGES ON GLASS ARTICLES

INVENTOR.
KENNETH G. LUSHER
BY J. R. NELSON &
W. A. SCHAICH
ATTORNEYS

Nov. 4, 1969    K. G. LUSHER    3,476,045
METHOD OF OFFSET PRINTING MULTICOLOR
IMAGES ON GLASS ARTICLES

INVENTOR.
KENNETH G. LUSHER
BY  J. R. NELSON &
    W. A. SCHAICH
        ATTORNEYS

United States Patent Office 3,476,045
Patented Nov. 4, 1969

3,476,045
METHOD OF OFFSET PRINTING MULTICOLOR IMAGES ON GLASS ARTICLES
Kenneth G. Lusher, Perrysburg, Ohio, assignor to Owens-Illinois, Inc., a corporation of Ohio
Continuation-in-part of application Ser. No. 242,299, Dec. 4, 1962. This application Oct. 23, 1965, Ser. No. 503,247
Int. Cl. B41c *3/08;* G03g *13/14*
U.S. Cl. 101—129
2 Claims

ABSTRACT OF THE DISCLOSURE

Methods for electrostatic offset printing of multicolor images on hot glass articles. A reversed image in the form of a layer of powder particles is applied to an offset element by brushing the particles of colored powder through individual stencils, each conformed to the area of the particular color and subsequently electrostatically transferring the completed image to a cylindrical article by rolling the article laterally across the powder layer while applying a suitable electric field.

REFERENCE TO RELATED APPLICATION

This application is a continuation-in-part of my prior application Ser. No. 242,229, filed Dec. 4, 1962, now abandoned.

In the art of xerography or electrophotography, images are reproduced conventionally by forming and developing a latent image on a plate member which includes a photoconductive insulating layer. A plate is prepared for image formation by placing a substantially uniform electrostatic charge on the surface of the photoconductive insulating layer. This layer is characterized by its ability to rapidly dissipate its charge upon exposure to activating radiation such as light, penetrating radiation, or the like due to a change in the insulating characteristics of the photoconductive insulating material. This layer is also characterized by its ability to retain charge in areas not in the path of the activating energy. Thus, following exposure of a sensitive xerographic plate, a latent image of electrostatic charges is formed on the plate's surface. This latent image may be developed through the deposition of finely divided electrostatically charged powder particles which, when presented to the plate, will adhere to the electrostatic image bearing surface in conformity with the electrostatic charge pattern thereon.

The developed image comprising powder paricles held in position by electrostatic lines of force may be examined, photographed, or the like on the plate surface, or the developed image may be transferred to another support base for viewing, photographing or the like. Whether on the plate surface or on another support base, the powder image may be made permanent using known xerographic techniques such as heating, vapor fusing, covering the image with a protective transparent coating, or the like.

In contrast to this conventional xerographic printing process, the process of the present invention forms no latent image and does not require the dusting upon or other complete covering of electrostatically charged surface with subsequently charged particles. Rather, the present invention proposes the initial formation of the printing particles into a coherent offset image corresponding to the printed image preferably, though not necessarily, as a mirror image thereof, in the subsequent electrostatic transfer, attraction or other deposition of the particles in the desired image orientation in the final printing orientation may then be fixed to the surface of the printed medium in any desired fashion as well known in the art, e.g., by heating, vapor fusing, covering with a transparent coating, or the like.

Thus, the particles need not be electrostatically attracted or oriented into the offset image, but merely are electrostatically attracted in their previously oriented image relationship to the printing surface. This difference is material and is, in fact, of crucial important to several specific xembodiments of the present invention, since it makes possible for the first time the initial formation of the offset image by any desired mechanical or triboelectric technique, such as stenciling, silk-screening, rubbing or the like. Further, if desired, multiple color images may be formed at the printed surface by the simultaneous or sequential attraction attraction of multicolored particles in a desired, exactly registering orientation.

Additionally, and equally importantly, the invention proposes, in one preferred embodiment, the transfer or attraction of the image in an electrical field by progressive line contact between the initially formed image and the surface to be printed. Preferably, at least one of the surfaces, i.e., either the initial, offset image surface or the surface to be printed, is convexly curved, and the surfaces are relatively moved in line contact, e.g., by rolling, so that the initial or offset image is progressively attracted electrostaically to the surface to be printed. In this manner, scattering or diffusion of the image is minimized, the gap across which the electrostatic transfer is accomplished can be reduced to a minimum, and the simultaneous transfer of multiple colors is facilitated.

Manipulatively, the process of the present invention requires the initial formation of the offset image which is to be transferred to the surface to be printed. As above explained, this image may be formed in several different ways, all of which are distinct from the usual or conventional xerographic process in that no latent image is formed.

For example, the image may be formed by positioning an electrically conductive offset printing plate or roller against a silk screen, stencil or the like perforate surface bearing at its opposite side a layer of printing particles which are forced through the openings in the screen, defining the offset image, onto the surface of the printing plate. The particles may well be forced through the interstices of the screen by brushing, rubbing or other mechanical agitation effective to physically force the particles through the screen and onto the printing surface. Where such mechanical agitation and forcing is utilized, the particles will become adherent to the printing surface.

Alternatively, the particles may be blown or conveyed through the interstices of the screen or through a stencil in fluid suspension for adherence to the printing matter.

After the printing image has been obtained at the printing surface, the printing surface is juxtapositioned with relation to the surface to be printed and the particles are electrostatically attracted, in their predetermined pattern, to the surface to be printed. Te surfaces are electrically conductive or are rendered effectively conductive, as by utilizing a metallic backup roll for a nonmetallic surface to be printed, and an electrical potential difference is imposed between the two surfaces, so that the particles are electrostatically attracted to and adhered upon the surface to be printed. The distance between the surfaces may be of varying dimension, even to the extent that the surface to be printed may be an actual surface contact with the particles on the printing plate.

It has been found that extremely desirable results may be obtained by progressively linearly contacting the surface to be printed and the particles during the transfer, this contact being readily obtainable where one of the surfaces is convex and the two surfaces are moved relatively to one another during the transfer. For example, in printing upon a cylindrical object, such as a bottle, the object may be merely rolled over the printing plate, or alternatively, in printing a flat sheet, the printing or offset plate may be formed as the circumferential surface of a printing cylinder.

Further, as above explained, the printing of multicolor images can be readily obtained by following the principles of the present invention. Preferably, the image at the printing plate is formed of multicolor particles oriented with respect to one another during their deposition upon the printing plate in such manner as to form an image corresponding to the final desired image. Alternatively, successive depositions of differently colored particles upon the surface to be printed may be readily obtained by electrostatically attracting differently colored particles in sequence from separate printing plates.

It is, therefore, an important object of the present invention to provide a new and novel method of electrostatic printing by the formation of an offset image defined by a plurality of particles which are subsequently electrostatically attracted to a final printing surface.

Another important object of the present invention is the provision of a method of electrostatic printing differing from a conventional xerographic printing process in that no latent image is formed but rather a plurality of printing particles are initially formed into a coherent offset image corresponding to the printed image and subsequently electrostatically attracted in the desired image orientation directly to the surface to be printed.

It is a further object of this invention to provide a method of electrostatic printing wherein a multicolored printed image is formed on an article surface by the electrostatic attraction to the surface of colored particles from an offset printing surface at which the particles exist in a corresponding image orientation.

An additional, and no less important, object is the provision of a process for electrostatic printing by the electrostatic attraction of an image to a surface to be printed throughout progressive line contact between the surface to be printed and particles in the desired orientation upon an offset printing surface.

Other objects of this invention will appear in the following description and appended claims, reference being had to the accompanying drawings forming a part of this specification wherein like reference characters designate corresponding parts in the several views.

Figure 14:
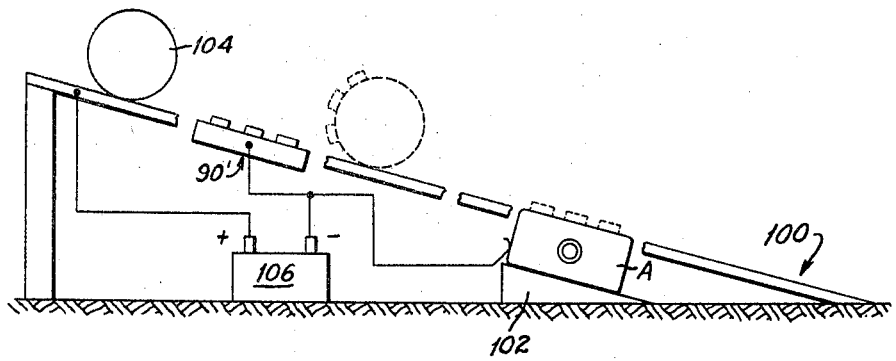
Figure 10:
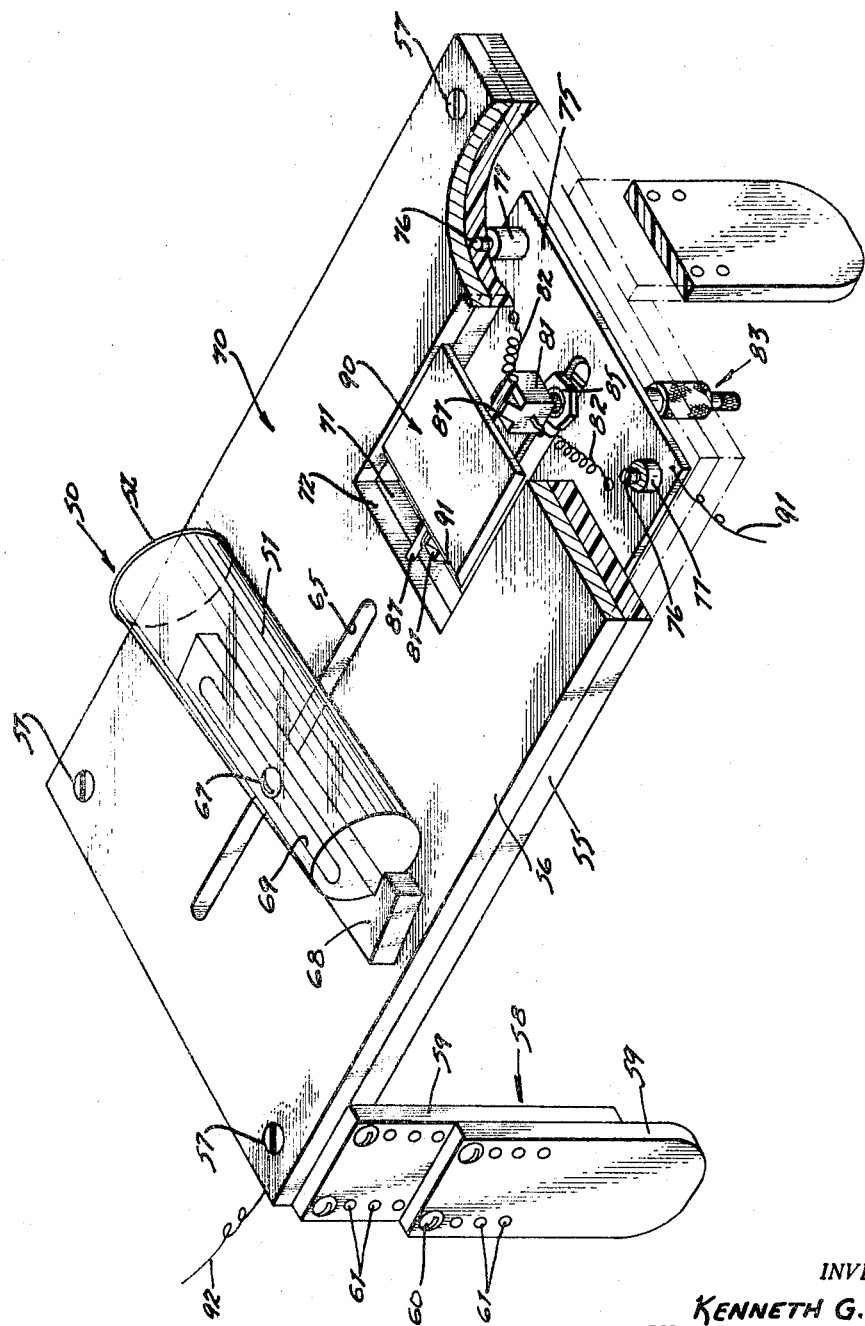
FIGURE 10 is an elevational perspective illustration, with parts broken away and in section, of an apparatus for carrying out a method of the present invention.
Figure 11:
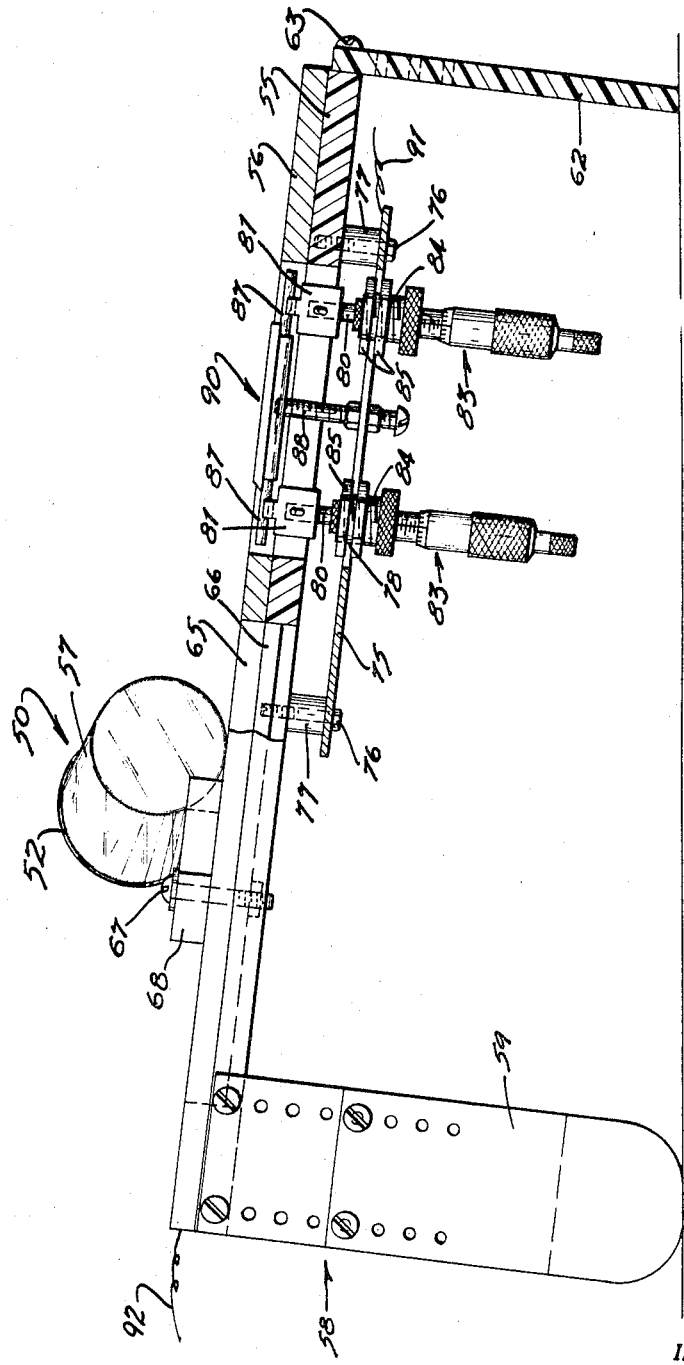
FIGURE 11 is a side elevational view, with parts broken away and in section, of the device of FIGURE 10.
Figure 12:
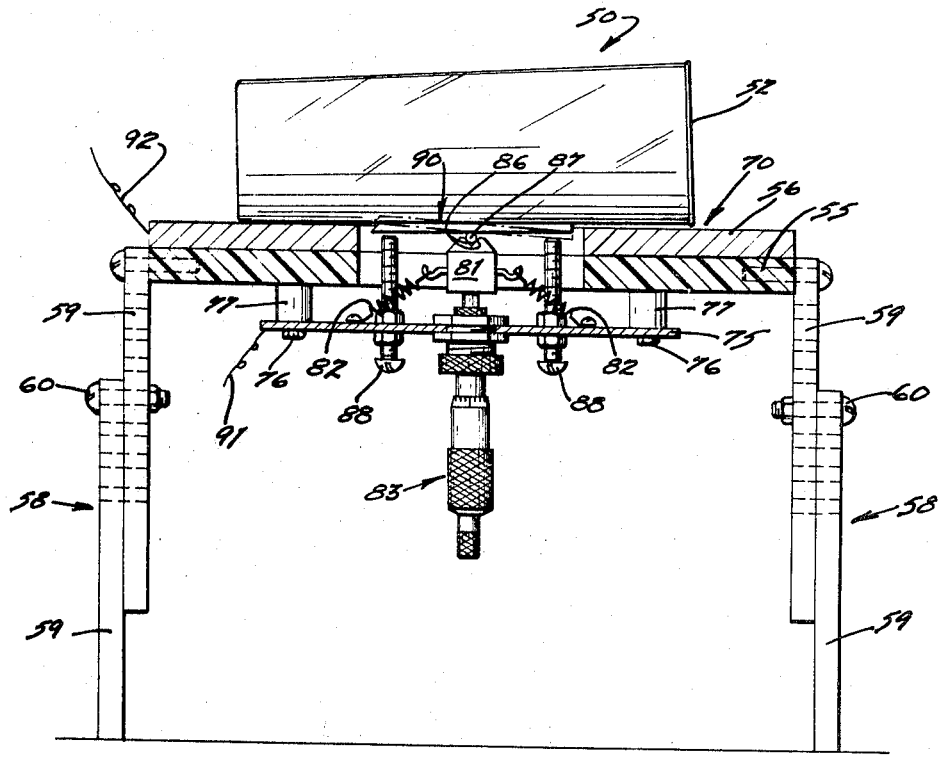
FIGURE 12 is a sectional view illustrating the device of FIGURES 10 and 11, the view being taken along the plane 12—12 of FIGURE 11.
Figure 13:
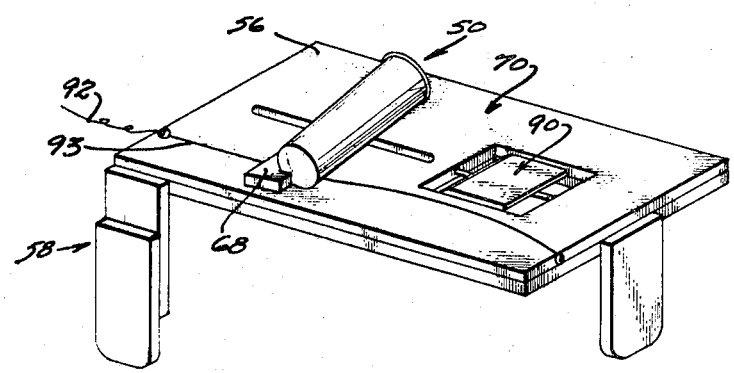

FIGURE 13 is a schematic representation of an apparatus conforming generally to the apparatus of FIGURES 10 through 12 but modified to provide a different form of electrode for the article to be printed; and FIGURE 14 is a schematic representation, partially in cross section of another embodiment of the invention wherein the invention is employed to apply an offset printing method for decorating articles having a flat surface.

As shown on the drawings:

The general method of the present invention is suceptible to substantial modification but, as above defined, the invention comprehends the initial formation of an image corresponding, either exactly or in mirror relation, to the image to be formed on the final printed article. This image is formed upon a carrier or printing plate, sometimes hereafter referred to as "substrate," this substrate being subsequently utilized to print the image on the final surface in a manner analogous to the well known process of offset printing. The electrostatic attraction of the particles from the substrate to the article to be printed is accomplished by subjecting the particles and the surface to which they are to be applied to an electrostatic field of sufficient intensity and appropriate polarity to attract and adhere the particles to the surface to be printed. Following this attraction and adherence, it only remains necessary to fix the particles to the surface to form a permanent, tightly adherent, preferably nonparticulate image-defining coating on the article.

The substrate is capable of substantial variation depending upon the material to be printed, the type of particles to be utilized, etc. Further, the configuration of the substrate is also capable of substantial variation. For example, the substrate may be a cylindrical roller capable of functioning in a manner analogous to an offset printing roll or the substrate may have a planar surface to which the particles are applied as illustrated in the drawings.

The particles themselves are capable of wide variation, these variations being in composition, size, and physical characteristics dependent primarily, upon the article to which they are applied. The various forms and types of particles to be utilized are hereafter more fully disclosed.

Last, but not least, the surface to which the printing is to be applied is also capable of substantial variation. For example, extremely advantageous results have been obtained in the printing of glass surfaces, as fully set forth in the application of William H. Wood, filed Dec. 4, 1962, Ser. No. 242,230, and assigned to the assignee of the present invention. The printing of such glass articles is also hereafter described in greater detail.

Additionally, it has been found that the printing method of the present invention may be readily adapted to the printing of paper (either in web form or in sheet form), plastic materials (either in seheet form or as dscrete articles), wooden articles, cloth, or the like. Of course, the method requires the electrostatic attraction of the printing particles to the surface of the article to be printed. Consequently, when an electrically nonconductive article is to be printed, some means must be provided for forming an electrostatic field effectively encompassing the surface of the article to be printed and providing the requisite polarity for electrostatic attraction. It has been found that this can easily be accomplished in any one of several different ways. For example, in the printing of paper or plastic sheet materials, it is only necessary to provide a metallic backup roll or plate at the area of electrostatic attraction. Alternatively, the surface to be printed may be previously electrostatically charged by induction or ion bombardment.

Printing particles

In the hereafter disclosed specific embodiments of the invention, the printing of glass is specifically set forth. In the above-identified copending application of William H. Wood, several specific particle compositions for utilization in the printing of glass are disclosed. These specific compositions are identical with those utilized in accordance with the method of the present invention, and such compositions are herein incorporated by reference. Further, the Wood application also discloses specific operating conditions of temperature, voltage, particle size, etc. which need not be repeated here, but which are also applicable to the methods herein described and claimed.

For the printing of other materials, suitable particulate materials are well known in the art and such well known compositions may be readily appropriated for use herein. Exemplary of such materials are those materials set forth in the disclosure of U.S. Patent 2,966,429 to Darrel et al.; in U.S. Letters Patent 3,013,890 to Bixby et al.; in U.S. Letters Patent 2,955,035 to Walkup et al.; in Walkup U.S. Letters Patent 2,618,551, and in Walkup and Wise U.S. Letters Patent 2,638,416.

Generally, such materials are available in a variety of colors or can be readily adapted for various colors by the incorporation therein of pigments or dyes of the desired coloration.

The embodiment of FIGURES 1 through 5

In that embodiment of the invention illustrated in FIGURES 1 through 5, there is illustrated the application of a multicolor image to a glass article. It will be appreciated that substantially the same technique may be utilized in the application of multicolor images to any material or article which may be desired and, further, that monochromatic images may be applied by an adaption, actually a simplification, of the basic technique.

Figure 1:
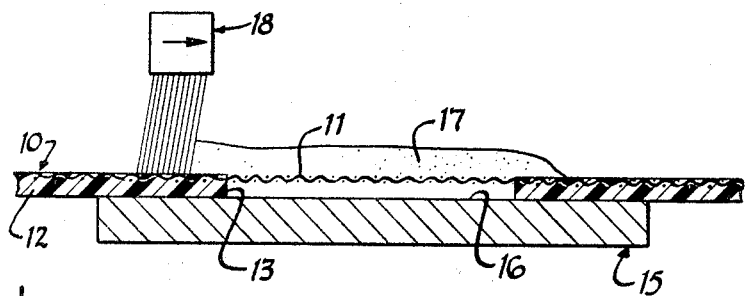
FIGURE 1 is a schematic representation of a screen and offset printing element positioned to form on the offset printing element an image to be subsequently printed in accordance with the method of the present invention.

In FIGURE 1, reference numeral 10 refers generally to a screen or stencil. Such screens are generally referred to as "silk screens" although the screen element 11 thereof may be formed of fine wire, such as stainless steel wire, or by punching or otherwise forming small apertures in a metallic plate or the like. The screen 11 is coated with and invested within a non-metallic coating 12 which is substantially thicker than the thickness of the wire 11 and which is generally a gelatinous material, such as a bichromated gelatin applied to the metallic screen 11 as a solution and allowed to dry in the absence of light. The dried gelatinous material 12 is sensitive to light, and the gelatin will become insoluble in water by exposure to light.

This light sensitive resultant screen 10 may have images readily produced thereon by various well known photographic techniques. For example, a photographic transparency can be superimposed on the sensitized screen 10 and exposed to light until the exposed gelatin coating 12 becomes insoluble. By leaching the screen with hot water, the non-exposed or image areas will be dissolved while the exposed or background areas will remain.

Preferably, the screen is now treated with a hardening agent, such as formaldehyde, glyoxal or the like which acts to cross link the polypeptide linkages in the remaining gelatin and to toughen the film. Of course, the material 12 may not be gelatinous but may contain or include other materials such as glue, polyvinyl alcohol, a mixture of polyvinyl alcohol and polyvinyl acetate, shellac or the like.

In short, any of the well known "silk screen" forming and developing techniques may be utilized to provide the screen or stencil 10 having therein openings 13 which correspond to the final printed image or a portion of the final printed image. Of course, the openings 13 may correspond to a mirror or reflective image of the final printed image or may correspond directly thereto.

In either event, the finished and developed screen 12 is superimposed over a lower printing plate or substrate indicated generally at 15 and having a planar upper surface 16 abutting the undersurface of the undeveloped or non-apertured portions of the screen 10 and bridging the developed, image-defining apertures 13 therein. This substrate 15 is preferably metallic because of its electrically conductive properties although non-metallic substrates which are coated, plated, or abutted by electrically conductive material may be utilized, as may nonmetalic substrate materials capable of conducting an amount of current sufficient to form one of the polar elements of an electrical field.

After the relative positioning of the substrate 15 and the screen 10 as illustrated in FIGURE 1 of the drawings, the particulate printing material is applied to the exposed portions of the surface 16 of the substrate. This preferably is carried out by superimposing a body 17 of such particles upon the screen, the size of the particles being related to the interstices of the screen, so that the particles do not merely fall through the screen onto the surface 16 of the substrate.

Next, a bristle brush 18 or other agitating and pressurizing means is brushed across the surface of the screen to mechanically force particles from the body 17 through the screen 10, or more accurately through the aperture 13 of the screen 10 onto the surface 16 of the substrate 15. While this transfer of the particles through the aperture 13 may be accomplished in several different ways, the utilization of the brush 18 possesses substantial advantages. It affords a positive means for forcing the particles through the aperture 11, the functions of the brush can be readily automated, and the act of brushing the particles onto the plate adheres the particles to one another and to the surface 16 to aid in maintaining a clear cut and coherent mass of particles at the surface 16, as indicated by reference numeral 20 in FIGURE 10. This coherent mass 20 corresponds substantially identically to the image aperture 13 in the screen 10, and it has been found that complex images, even including half-tone photographic illustrations, may be accurately and precisely reproduced in the layer 20.

Figure 2:
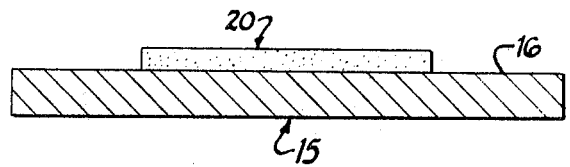
FIGURE 2 is a schematic representation of the printing element having applied thereto oriented printing particles.

In the event that the final printed image is to be monochromatic, the printing plate or substrate 15 of FIGURE 2 can be used directly.

Figure 3:
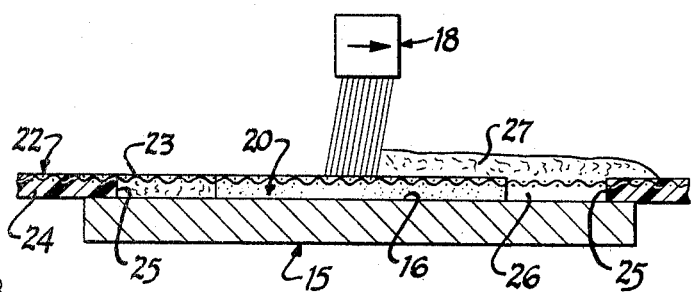
FIGURE 3 is a view similar to FIGURE 2 illustrating the application to the printing element of particles of a second, different orientation or coloration.

However, inasmuch as one of the most desirable features of the present invention involves the application of multicolor images to the surface to be printed, a preferred embodiment of the invention subjects the coated or finished substrate 15 to the subsequent step illustrated in FIGURE 3 of the drawings. In a specific instance, the substrate 15 bearing upon its upper surface 16 the coherent body of particles 20 of one coloration, e.g. blue, is positioned in abutment with the undersurface of a second stencil or screen 22 of substantially the same construction as the stencil 10 heretofore described in that a wire 23 is invested in a gelatinous coating 24. However, the screen 22 has been exposed, treated, and leached to provide an aperture 25 therein which encompasses the material 20 as retained upon the substrate 15. As a result, when the substrate 15 is positioned against the undersurface of the screen 22, as illustrated in FIGURE 3, a marginal space 26 is provided by the aperture 25 at least partially surrounding or misaligned with the oriented and compacted body of particles 20.

Figure 4:
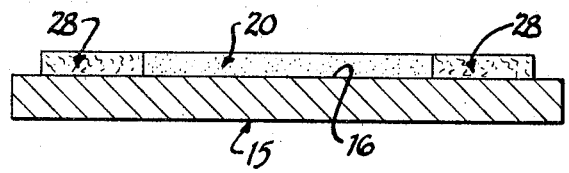
FIGURE 4 is a view similar to FIGURE 2 but illustrating the printing element having particles of different coloration or orientation applied thereto.

By applying to the surface 27 a layer of particles of a coloration, texture or other characteristic different from the layer of particles 17 initially applied to the substrate surface 16, e.g., white, and then forcing the particles from the body 27 through the screen aperture 25 onto the substrate surface 16 by suitable means, as by the brush 18, the differently colored particles 27 are forced through the screen aperture 25 in surrounding relation to the particle body 20, the second compacted body of particles being identified by reference numeral 28 in FIGURE 4.

At the time of positioning the substrate 15 in contact with the undersurface of the screen 22, the previously applied, compacted, oriented particles 20 fill the interstices of the screen wire 23 and prohibit the passage of particles 27 through the aperture 25 at the areas to which the particles 20 have been previously applied.

Thus, it is possible to provide printing particles of different characteristics upon the surface 16 of the substrate 15 for subsequent simultaneous electrostatic attraction to a surface to be printed.

Figure 5:
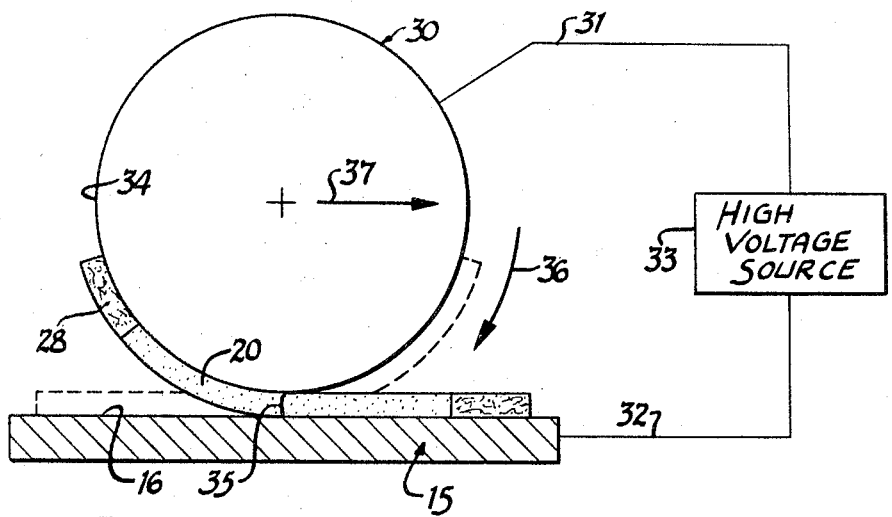
FIGURE 5 is a schematic representation illustrating the printing of a cylindrical article by a method of the present invention and utilizing the printing element of FIGURE 4.

In FIGURE 5, the articles to be printed is indicated by reference numeral 30, the article being generally cylindrical in cross-sectional configuration, e.g., a glass bottle or the like, and being connected by a lead line 31 to a high voltage source 33, the other side of the high voltage source being connected by lead line 32 to the conductive substrate 15. By applying a relatively high voltage, e.g., on the order of 1 to 20 kilovolts, across the space 35 between the article 30 and the substrate 15, the particles 20 and 28 are attracted from the surface 16 of the substrate 15 onto the surface 34 of the article 30. This electrostatic attraction, of course, results from the fact that the particles on the substrate will pick up the charge of the substrate and will be attracted to the surface 34 of the article 30 by virtue of the relative opposite polarity of the surface.

Preferably, as illustrated in FIGURE 5 of the drawings, the article has its surface 34 in contact with the particles 20, 28 so a minimal gap is formed across which the attraction occurs by the electrostatic phenomenon. However, the relative level of the surfaces 17 and 34 may be adjusted to provide gaps of up to ¼ inch. Further, it will be noted that the article 30 is rolled or otherwise moved relative to the substrate 15 and the particles 20, 28 thereon, this movement occurring by peripherally rolling the article 30 (indicated by directional arrow 36) across the substrate 15 with the article axis being translated laterally (as indicated by direction arrow 37).

Alternatively, the substrate surface 17 may be concavely curved to conform generally to the convex surface 34 of the article or, if a flat surface 34 is to be printed, a convex substrate surface 17 may be used. Whether relative substrate-article surface motion is involved or not depends upon the type of surface ot be printed and the relative ease of printing by different techniques as above outlined.

Figure 6:
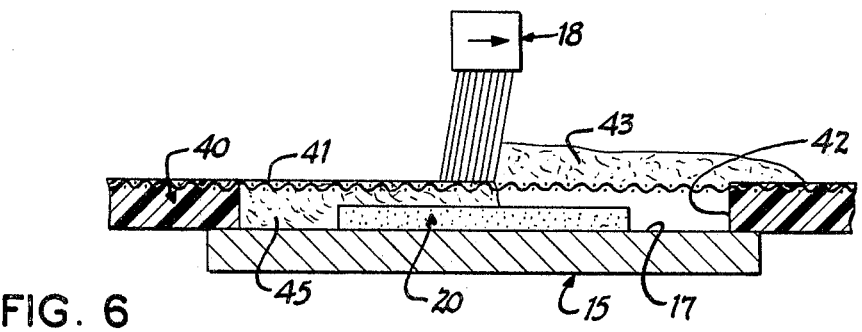
FIGURE 6 is a view similar to FIGURE 3 but illustrating the application of particles of a second coloration to an offset printing element having thereon previously applied particles of a first coloration in a different manner from that illustrated in FIGURE 3.
Figure 7:
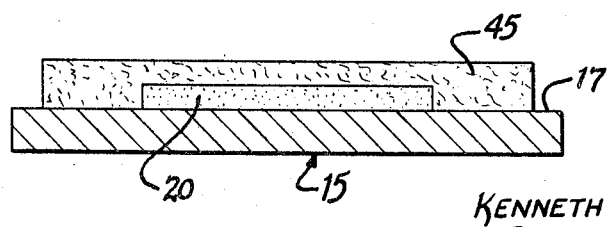
FIGURE 7 is a view similar to FIGURE 4 but illustrating the colorant particles applied and oriented in accordance with the method of FIGURE 6.

The embodiment of FIGURES 6 and 7

It will be recalled that in the embodiment of FIGURES 1 through 5, the stencil or screen 22 was of substantially the same depth as the stencil 10 of FIGURE 1, so that the successively applied particles 20, 28 were oriented to substantially the same depth.

A modification of this basic technique is illustrated in FIGURES 6 and 7 wherein the particles 20 are applied to the surface 17 of the substrate 15 in a manner analogous to that illustrated in FIGURES 1 and 2 but wherein a secondary screen 40 having a vertical dimension or depth appreciably greater than the depth of the screen 20 or 22 is utilized.

The correlation between these screens is susceptable to substantial variations. Since the depth of the screen is correlated to the thickness of the wire utilized, screen thickness is normally defined by defining the size or diameter of the wire utilized. In a specific example, three color prints were made upon substrates by utilizing a first color (corresponding to the powder image 20), applied through a 200 x 200 mesh x 0.0016 inch diameter wire screen, and a second color was then applied through a second screen (corresponding to the screen 40) having a 165 x 165 mesh x 0.0020 inch diameter wire screen. A third color was applied at a third screen which was a 135 x 135 mesh x 0.0023 inch diameter wire screen.

Thus, the wire of the screen 41 is of somewhat greater diameter than the wire 23 of the screen 22 heretofore described, and the aperture 42 in the screen is of a size sufficient to at least encompass all portions of the preformed and compacted image 20. A layer of particles 43 upon the upper surface of the screen 41 is then forced through the wire 41 by a brush 18, as heretofore described, the particles 43 forming an image 45 peripherally encompassing and overlying the preformed image 20, as best illustrated in FIGURE 7 of the drawings. The image formed by the particles 20 and 45 upon the upper surface 17 of the substrate 15 can be readily applied to an article 30 by the technique above discussed in conjunction with FIGURE 5 of the drawings.

Comparison of the printed images

Figure 8:
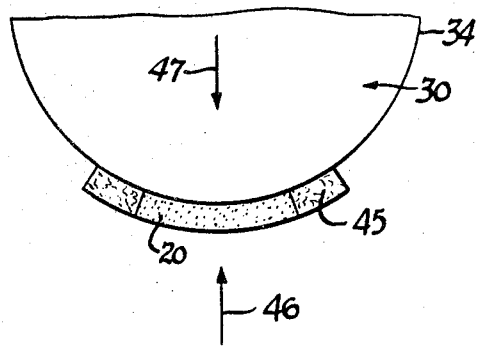
FIGURE 8 is a schematic representation of a cylindrical article printed by a method of the present invention and utilizing a printing plate of FIGURE 4.
Figure 9:
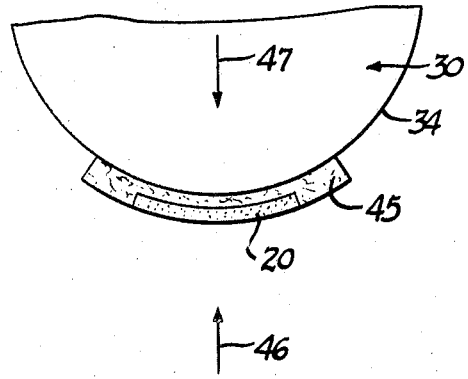
FIGURE 9 is a view similar to FIGURE 8, but schematically illustrating a cylindrical article having applied thereto printing made by utilization of the printing plate of FIGURE 7.

In FIGURES 8 and 9 of the drawings, a direct visual comparison of the images obtained by utilizing the embodiment of FIGURES 1 through 5 and the embodiment of FIGURES 6 and 7 is illustrated.

It will be noted that the articles 30 have convex surfaces 31 to which the particles are applied. Assuming that these articles 30 are transparent or at least translucent, as in the case of glass articles, a person viewing the printed image of FIGURE 8, made by the techniques of FIGURES 1 through 5, inclusive, from the direction of directional arrow 46 would merely see the two-color printed image defined by the particles 20 and the particles 45. However, a person viewing the printed image through the transparent or translucent article 30, as in the direction of the directional arrow 47 would see a mirror image of the printed image when viewed in the direction 46.

By comparison, one viewing the article 30 of FIGURE 9 from the direction of directional arrow 46 would see substantially the same image as one viewing the article of FIGURE 8. However, one viewing the image of FIGURE 9 through the translucent or transparent article 30, i.e., in the direction of the arrow 47, would merely see that the portion o fthe image defined by the particles 45 as a smooth, monochromatic image.

Thus, the possibility of viewing the printed image in reverse or as a mirror image will be eliminated by utilizing the technique of FIGURES 6 and 7. Under some circumstances, one may desire to use the technique of FIGURES 6 nad 7 in preference to the technique of FIGURES 1 through 5, but both techniques fall within the purview of the present invention.

Of course, it will be appreciated that the above-defined techniques of forming multicolor images by the successive application of particles can be utilized to successively apply particles of the same essential coloration but of different texture, particle size or other physical characteristics to yield differing effects. Similarly, separate substrates each bearing a portion of a complete image can be successively utilized to offset print a final multicolor image.

The embodiment of FIGURES 10 through 13

In that embodiment of the invention illustrated in FIGURES 10 through 13, the invention is illustrated as adapted to the printing of a cylindrical object, such as a glass bottle, jar or tumbler, indicated generally by reference numeral 50. The article 50, while being generally cylindrical, may depart somewhat therefrom in that the peripheral or side walls 51 thereof may be somewhat conical and the open upper end may be provided with a peripheral outturned lip 52. In any event, the article 50 essentially is an article of revolution and will roll about its longitudinal axis.

The apparatus comprises generally a lower insulating plate 55 formed of a suitable insulating material, such as a laminar plastic material sold under the trade name "Formic," having superimposed thereon an upper plate 56, preferably formed of an electrically conductive material, such as the material sold under the trade name "Transtie." The two plates 55 and 56 are preferably secured together in face-to-face abutment by suitable means, as by screws 57. The lower plate 55 is provided with depending support legs including a pair of adjustable leg assemblies 58 adjacent one end thereof and including upper and lower leg elements 59 adjustably secured together, as by means of bolts 60 traversing aligned apertures 61 in the leg elements 59. A single center leg 62 may be adjustably secured to the other or remote end of the plate 55 by suitable means, as by screws 63 capable of adjustment in vertically aligned holes 64. This three-legged construction will support the plates 55, 56 in an elevated position above a supporting surface at a varying inclination to accommodate rolling of the article 50 downwardly over the surface at varying speeds.

The plates 55 and 56 are provided with registering, longitudinally elongated slots 65, 66, respectively, through which project an adjustment bolt 67 securing an abutment block 68 in position upon the upper exposed surface 70 of the conductive plate 56, this block 68 being provided with a transverse adjustment slot 69, so that the block is adjustable longitudinally and transversely of the surface 70. The block 68 defines the point of departure for the rolling movement of article 50.

The plates 55 and 56 are also provided with vertically registering rectangular apertures 71, 72, respectively, beneath which is suported a conductive plate 75 secured to the lower insulating plate 55 by suitable means, as by bolts 76 traversing insulating spacer blocks 77.

The conductive board 75 is provided with a pair of apertures 78 through which extend terminal posts 80, these posts projecting above the plate and into the registering apertures 72, 71 to bear at their upper ends support blocks 81, these blocks being telescoped over the supporting posts 80 and retained thereon by tension springs 82 secured at their upper ends to the blocks 81 and at their lower ends to the plate 75. The posts 80 are fixed to the lower micrometer-type adjusting handles 83 surrounded by threaded collars 84 secured to the plate 75 by pairs of nuts 85, respectively. Thus, it will be seen that the supporting blocks 87 are supported by the plate 75 and yet are vertically adjustable relative thereto to a fine degree of accuracy by virtue of the adjusting handles 83.

From FIGURE 12, it will be seen that the supporting blocks 85 have at their upper ends V-shaped notches 86 receiving therein pivot studs 87 secured to a printing plate or substrate indicated generally at 90. Preferably, the pivot studs 87 are provided by a cylindircal rod merely welded or otherwise secured to the undersurface of the substrate 90. Thus, the substrate 90 is pivotal about an axis extending longitudinally of the plate 56 and generally aligned with the slot 65 therein.

To limit the tilting of the substrate 90 about the axis of the pivot studs 87, the plate 90 carries a pair of stop screws 88. Additionally, that edge 91 of the plate directed toward the block 68 is beveled.

The operation of the device illustrated in FIGURES 10 through 12 is such that the device is capable of carrying out the methods of FIGURES 1 through 9. More specifically, the conductive plate 75 is connected to one side of a high voltage source, as by lead line 91, while the other side of the high voltage source is connected to the conductive plate 70, as by lead line 92. Thus, a piece of heated glass, such as the article 50, placed upon the surface 70 is, in effect, of an opposite polarity from the plate 90.

Alternatively, as illustrated in FIGURE 13 of the drawings, the surface 70 is formed on a plate 56 which is of insulating character and the lead line 92 is secured to a second lead line 93 which is a piece of spring wire or other conductor secured to the insulating plate 56 and arched upwardly to maintain good electrical contact with the article 50.

In either event, the block 68 is adjusted by means of the plate slots 65, 66 and the block slot 69 to fix the article 50 in such a position that, when released, it will roll over the plate 90 with the peripheral surface 51 thereof contacting the upper surface of the plate 90. The pivotal mounting of the plate by means of the pivot block 81 insures the maintenance of face-to-face contact between the peripheral surface of the article 50 and the plate 90, while the beveling of the plate edge 91 accommodates the smooth transfer of the article 50 from the surface 70 to the plate 90. Further, it will be noted that the plate 90 is supported by the block 81 in a somewhat elevated position, so that the exposed surface of the plate 90 is somewhat above the level of the planar surface 70. Of course, the relative levels of the surface of the plate 90 and the supporting surface 70 determines the gap between the surface 51 and the particles supported on the plate 90, the plate 90 having been previously coated with particles oriented in an image relationship in the manner hereinbefore discussed in connection with FIGURES 1 through 7. Where the plate surface 90 is elevated above the surface 70, as illustrated in FIGURES 11 and 12, the surface 51 will actually contact the particles and no actual gap will exist. However, by means of the vertically adjustable posts 80, the level of the plate 90 may be lowered to provide an actual, adjustable gap across which the electrostatic attraction will occur.

Specific examples

A first offset image corresponding to the image of FIGURE 4 was prepared utilizing a screen 10, of 200 x 200 mesh by 0.0016 inch diameter wire superimposed over a ⅛ inch mild cold rolled steel plate 15. Blue particles of the following composition were brushed through the screen 10 onto the surface 16 of the plate 15.

| Oxide: | Percent of wt. |
|---|---|
| PbO | 43.0 |
| $SiO_2$ | 32.4 |
| $B_2O_3$ | 2.5 |
| $ZrF_4$ | 2.0 |
| $ZnO_2$ | 2.0 |
| BaO | 1.3 |
| $TiO_2$ | 1.0 |
| $Na_2O$ | 5.1 |
| $Co_3O_4$ | 10.6 |

The aperture 13 in the screen 10 formed the image 20 on the plate 15 as a reverse image of the word "Cola."

Next, the screen 22 identical to the screen 10, but having an enlarged pattern-defining aperture therein, was utilized to apply a second color in surrounding relation to the first image 20, the second coloration being white and having the following composition.

| Oxide: | Percent by wt. |
|---|---|
| PbO | [1] 53.1 |
| $SiO_2$ | [1] 27.3 |
| $B_2O_3$ | [1] 5.9 |
| BaO | [1] 1.5 |
| $TiO_2$ | [1] 2.25 |
| $Na_2O$ | [1] 2.15 |
| NaF | [1] 2.20 |
| $ZrO_2$ | [1] 4.0 |
| ZrO | [1] 1.6 |
| $TiO_2$ | [2] 11 |

[1] Flux phase.
[2] Percent pigment phase.

The particles constituting both the blue image and the white surrounding coloration 28 were of a nominal 13 to 26 inch micron size.

The plate 15 so prepared was then placed in the apparatus illustrated in FIGURES 10 through 13 occupying the position illustrated by the plate 90 and being freely pivotable in the pivot blocks 81 as above-described. The apparatus of FIGURE 10 was adjusted at the legs 58 to incline the surface 70 so as to provide a 2¾ inch rise for 18 inches in length. The plate 15 was positioned at a distance of 8½ inches from the top of the inclined surface 70 of the plate 56, and the block 68 was positioned at a distance of 4 inches from the top edge of the surface 70.

A glass object, corresponding to the tumbler 50 at a temperature of from 1000° F. to 1100° F. was placed against the block 68 and allowed to roll freely down the surface 70 over the image composed of the particles 20 and 28 on the plate 15 at an electrical potential difference between the hot tumbler and the plate 90, the tumbler being on contact with the surface 70, of six kilovolts. Satisfactory prints were obtained.

A second set of satisfactory prints were obtained by again forming the image 20 on the surface of the plate 15 by utilization of the 200 x 200 mesh by 0.0016 inch diameter wire screen 10, then positioning the image 20 on the plate 15 beneath a second screen 40 (as shown in FIGURE 6) and then brushing white particles of the above-defined composition through the screen 40. The screen 40 was of 165 x 165 mesh by 0.0020 inch diameter wire, so that the particle image 45 encompassed the image 20 as illustrated in FIGURE 7 of the drawings.

Satisfactory prints were then obtained by utilizing the apparatus of FIGURES 10 through 11 and under the conditions above set forth. The difference in visual appearance of the first and second prints was the difference above summarized in conjunction with FIGURES 8 and 9.

The embodiment of FIGURE 14

In the methods described above, the powder image or decoration is ultimately applied to the side surface of a cylindrical or slightly frustoconical article. The fact that the surface to which the powder image is to be applied is a surface of revolution is of some convenience in the printing operation in that registry between the offset plate and article surface is achieved in a simple manner by rolling the article laterally across the flat offset plate. Movement of the article into and out of registry with the image on the offset plate is readily achieved by employing the action of gravity or, in some instances not disclosed, by the use of rotatable chucks which may support the cylindrical article.

In those cases where it is desired to apply the printed image to a flat article surface, problems are frequently encountered in moving the prepared offset plate and flat article surface into and out of registry with each other. One simple solution to this problem is shown in the apparatus of FIGURE 14.

In FIGURE 14, there is schematically illustrated an inclined plane assembly designated generally 100 which corresponds in general to that employed in the previously described embodiments and hence has not been illustrated in great detail. An offset plate 90' is supported, prepared and located as in the previously described embodiments near the upper end of the inclined plane assembly and corresponds to the plate 90 of the FIGURE 10 embodiment. An article A to be decorated is supported to project through an opening in the plane as by a support 102, the flat surface of the article to be decorated being supported in parallel or coplanar relationship to the surface of the plane and slightly below the plane surface. A cylindrical transfer element 104 is supported on the upper surface of the plane and guided, by suitable means not shown, so that in rolling downwardly along the plane the cylindrical member rolls first across the prepared offset plate 90', and later rolls laterally across the surface of article A to be decorated. The spacing between plate 90' and the article surface is whole multiple of the circumference of transfer element 104.

The cylindrical element 104 is constructed of electrically conductive material and is electrically charged to one electrical polarity, for example to a positive polarity, by a voltage source 106 whose positive terminal may be connected to the electrically conductive surface of the inclined plane assembly 100. The opposite or negative terminnal of voltage source 106 is connected to offset plate 90' and to article A to electrically charge both the offset and the article to a selected negative potential.

From the foregoing description, it is believed apparent that upon making the electrical connections indicated in FIGURE 14, when the cylindrical transfer element rolls downwardly along the inclined plane assembly 100, the prepared powder image is electrostatically transferred from plate 90' to element 104 as the element rolls across plate 90' and is retransferred to the surface of article A as the cylindrical transfer element subsequently rolls laterally across the article surface.

By the foregoing arrangement, the requirement of complex mechanism for advancing the article and offset plate into and out of registry with each other is eliminated.

SUMMARY

From the foregoing data and the detailed description of the embodiments of the invention illustrated in FIGURES 1 through 14 of the drawings, is will be appreciated that the present invention provides a new and novel method of electrostatic printing.

More specifically, the present invention performs this printing act in a manner roughly analogous to offset printing in that the image to be obtained upon the surface to be printed is first formed upon a separate, distinct substrate. Many advantages are obtained by the utilization of such offset printing techniques as are herein disclosed. First, it is no longer necessary to form a latent image by an electrostatic process upon the article to be printed and then to flood this image with electrostatically responsive particles which cling only to the desired portions of the surface to be printed. Thus, much of the electrostatic apparatus and substantially all of the particle handling apparatus can be eliminated at the actual location at which printing is obtained. This makes possible the extreme simplification of the apparatus and the automation of the image-forming process which is perormed upon the substrate at a location remote from the printing location.

Additionally, the offset printing technique herein disclosed makes possible for the first time the application of multicolored particles in a predetermined image by merely performing the printing step a single time. Thus, all problems of registration are encountered and solved at the location of substrate formation and orientation of the particles upon the substrate. The simplification of the printing process will be readily appreciated.

While the specific examples hereinbefore given illustrate printing with the article to be printed in actual physical contact with the particles upon the substrate, it has been found in actual practice that gaps of up to ¼ of an inch or even greater may be tolerated in the event that such contact is not desired. However, the image sharpness, accurate color resolution, and positive attraction to the surface to be printed where the surface and the particles are in actual contact makes this the preferred embodiment of the invention.

So far as the particles are concerned, a wide variety of particles may be utilized as above explained.

In addition to its advantages in conjunction with multicolor printing, the progressive line contact afforded by forming one of the two surfaces, i.e. the substrate or the article to be printed, to a convex configuration and then maintaining only line contact during the actual transfer operation is also extremely advantageous. Again, these advantages are evident from the clarity of image resolution and in the lack of "scattering" or undesired background color upon the printed article. The progressive transfer or attraction of the particles to the surface to be printed thus constitutes one of the major advantages of the present invention.

I claim.

1. The method of electrostatic offset printing for printing an image upon a flat article surface comprising the steps of applying printing powder particles capable of being electrically charged to the surface of an offset plate to form the image to be printed, electrically charging the article surface and particles to a first potential, electrically charging an electrically conductive cylindrical transfer member to a different electric potential operable to effect electrostatic transfer of particles from said offset plate to said transfer member when said transfer member is rolled laterally across said offset plate at a predetermined spaced relationship thereto, rolling said charged transfer member laterally across said plate at said spaced relationship to transfer said image to said transfer member, and subsequently rolling said charged transfer member laterally across said article surface at substantially the same spaced relationship thereto to electrostatically transfer the image from said transfer member to said article surface.

2. The method as defined in claim 1 further comprising the steps of supporting said offset plate and said article surface in coplanar relationship with each other at a spacing corresponding to a whole multiple of the transfer member circumference.

References Cited

UNITED STATES PATENTS

| | | | |
|---|---|---|---|
| 1,787,456 | 1/1931 | Ryan | 101—252 |
| 2,147,653 | 2/1939 | King | 101—252 |
| 2,542,063 | 2/1951 | Tenety | 101—252 XR |
| 3,027,833 | 4/1962 | Fouser | 101—252 |
| 3,101,050 | 8/1963 | Schaefer et al. | 101—252 |
| 3,241,483 | 3/1966 | Duff | 101—129 |
| 3,245,341 | 4/1966 | Childress et al. | 101—122 |
| 3,253,540 | 5/1966 | Lusher | 101—170 |
| 3,276,358 | 10/1966 | Lusher | 101—129 |
| 398,995 | 3/1889 | Atterbury | 117—18 XR |
| 2,787,556 | 4/1957 | Haas. | |
| 2,940,864 | 6/1960 | Watson. | |

EDGAR S. BURR, Primary Examiner

U.S. Cl. X.R.

101—252, 426

PO-1050
(5/69)

UNITED STATES PATENT OFFICE
CERTIFICATE OF CORRECTION

Patent No. 3,476,045          Dated November 4, 1969

Inventor(s)     Kenneth G. Lusher

It is certified that error appears in the above-identified patent and that said Letters Patent are hereby corrected as shown below:

```
Col.  1, line 68, after "orientation" insert --directly upon the
    surface to be printed.  The deposited particles--
Col.  2, line  6, change "xembodiments" to read --embodiments--
         line 12, delete "attraction" (second occurrence)
         line 49, change "matter" to read --surface--
Col.  4, line 18, change "sucep-" to read --suscep- --
         line 61, change "dscrete" to read --discrete--
Col.  6, line  9, change "nonmetalic" to read --nonmetallic--
Col.  7, line 42, change "ot" to read --to--
         line 59, change "susceptable" to read --susceptible--
Col.  8, line 36, change "o fthe" to read --of the--
         line 42, change "nad" to read --and--
         line 71, change "Formic" to read --"Formica"--
         line 74, change "Transtie" to read --"Transite"--
Col. 11, line 66, after "is" insert --a--
         line 75, change "minnal" to read --minal--
         line 75, after "connected" insert --both--
Col. 12, line  2, before "and" insert --plate--
         line  9, before "retransferred" insert --then--
```

**SIGNED AND
SEALED
MAY 26 1970**

(SEAL)
Attest:

Edward M. Fletcher, Jr.
Attesting Officer

WILLIAM E. SCHUYLER, JR.
Commissioner of Patents